United States Patent Office 3,047,559
Patented July 31, 1962

3,047,559
METHOD OF MAKING POLYMER
Rowland H. Mayor, Stow, and Richard Leshin, Akron, Ohio, and Bernard Wargotz, Long Branch, N.J., assignors to The Goodyear Tire & Rubber Company, Akron, Ohio, a corporation of Ohio
No Drawing. Continuation of application Ser. No. 564,121, Feb. 8, 1956. This application Sept. 11, 1961, Ser. No. 137,019
9 Claims. (Cl. 260—94.3)

This invention relates to polymers derived from isoprene. More particularly, this invention relates to polyisoprene in which a major proportion of the isoprene residues have a "cis" configuration and to a method for preparing such polymers from isoprene.

Rubber and gutta percha are naturally-occurring high molecular weight materials which can be broken down into isoprene structural units by pyroylsis or destructive distillation. Although they have identical empirical formulas, X-ray diffraction studies show that these materials differ in the geometrical configuration or spatial arrangement of the atoms comprising their molecules. Rubber has been shown to have the "cis" form, which may be represented as

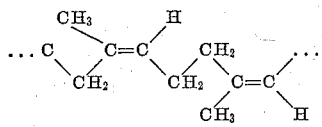

and gutta percha has been shown to have the "trans" form, which may be represented as

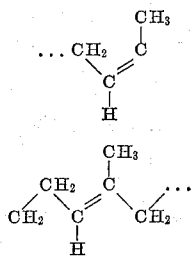

Of the two forms, the "cis" form is the more valuable, and its use commercially runs into millions of pounds per year. Large plantations are operated to produce this form from latex-bearing trees, in particular the *Hevea brasiliensis*, which produces about 95% of the world's natural rubber supply. Because rubber-producing trees require certain climatic conditions for their growth, they can be grown only in limited localities. Rubber is highly important to the life of modern civilization and is considered to be one of the essential raw materials for the production of both military and civilian goods. Because of its great industrial importance, there have been many efforts to make a substitute for rubber obtained from the *Hevea brasiliensis*. The production of rubber from other rubber-bearing plants has not been practical so far. The most successful substitute to date has been the synthetic copolymer of butadiene and styrene known as GRS rubber. This material, of course, does not have the same structure and properties as natural rubber, but it is a serviceable substitute for many purposes. It has not been possible, however, to produce satisfactory large truck tires from GRS because the heat caused by flexing and friction of the tires in use cannot be dissipated rapidly enough to prevent degradation of the tire. Natural rubber must be used for the production of large tires.

Many efforts have been made to produce another substitute which more closely resembles natural rubber. Such approaches as the polymerization of isoprene to polyisoprene by the usual methods, such as emulsion polymerization, have not been successful. The polymerization of isoprene by the usual methods produces a polymer which generally contains about 50% or more of the double bonds arranged in the "trans" configuration. This material is not suitable for use as a substitute for natural rubber.

It is an object of this invention to produce a synthetic rubber suitable for use in heavy duty tire applications. It is another object to produce a synthetic substitute for natural rubber. Another object of this invention is to provide a method for polymerizing isoprene to form a polymer having a major proportion of the isoprene residues arranged in the "cis" structural form. Still another object is to provide a method of producing a synthetic polymer which has the physical characteristics of natural rubber. Still another object is to provide new chemical compositions composed of isoprene molecules united substantially completely in the 1,4 positions and having a major proportion of the polymer oriented to form the "cis" configuration. Other objects will appear hereinafter as a description of the invention proceeds.

According to this invention, isoprene is polymerized in the presence of a catalyst comprising a complex or reaction product of titanium tetrachloride and an organometallic compound of the general formula

in which $R_1$ is selected from alkyl, aryl and aralkyl groups and $R_2$ and $R_3$ are selected from alkyl, aryl and aralkyl groups and hydrogen, or an etherate of such an organometallic compound.

The practice of the invention is illustrated by the following examples. The polymerization reactions described below were conducted in 4-ounce screw cap bottles. The bottles were charged under an inert atmosphere and, after charging, were sealed with metal caps containing neoprene gaskets and Teflon linings. After sealing, the bottles were kept at the temperature indicated.

*Example 1*

Under a nitrogen atmosphere, 350 grams of ethyl bromide were added slowly to 60 grams of a 69/31 (weight ratio) aluminum-magnesium alloy, a reflux temperature being maintained. The addition was completed in four hours, and the temperature was raised to 100° C. to insure complete reaction. After standing overnight, the product, diethylaluminum bromide, was distilled at 100° C. to 0.4 millimeter of mercury pressure, 193 grams (76% yield) being obtained. The product was added cautiously to 27 grams of sodium with warming. After an initial vigorous reaction, the reaction proceeded smoothly, the diethylaluminum bromide being added over a period of 2 hours at a temperature of 110–120° C. The mixture was then warmed slowly to 200–210° C. and maintained at that temperature for 2 hours. Distillation of the product at 75° C. and 1.6 millimeters of mercury pressure gave 64 grams (72% yield) of triethylaluminum.

*Example 2*

A mixture of 107.5 grams of diethylaluminum bromide (prepared as in Example 1), 34.4 grams of sodium fluoride and 150 milliliters of hexane was refluxed for one hour under a nitrogen atmosphere. The hexane was removed by distillation, and the product, diethylaluminum fluoride, was distilled at 97.5–1000° C. at 1 millimeter of mercury pressure. The distillate, which weighed 22 grams (32% yield) was heated further with 8.9 grams of sodium fluoride for 4 hours at 180–190° C. under nitrogen. Distillation at 85° C. and 1 millimeter of mercury pressure was very slow, yielding about 6 grams (37% yield) of triethyl aluminum in 1½ hours.

*Example 3*

A solution of 1 ml. of triethylaluminum (prepared by the method of Example 1) in 50 milliliters of hexane, in a 4-ounce bottle, was treated with 10 drops (0.25 milliliter) of titanium tetrachloride, giving a black precipitate. Twenty-five milliliters of isoprene were added, and the bottle was sealed and rotated in a 50° C. water bath for 16 hours. Very little reaction occurred, and the mixture was treated with an additional 0.2 milliliter of titanium tetrachloride and agitated at 50° C. for an additional 24 hours. The product was precipitated in isopropyl alcohol, containing a rubber antioxidant, and was treated to remove gel by dissolving the product in benzene, filtering and precipitating by pouring the benzene solution into isopropyl alcohol containing additional antioxidant. An infra-red spectral analysis on the purified rubber showed 96% cis-1,4 structure, 4% 3,4 structure, and no 1,2 or trans 1,4 structure.

*Example 4*

A solution of 1 milliliter of triethylaluminum (prepared in Example 2) in 25 milliliters of hexane was treated with 8 drops (0.2 milliliter) of titanium tetrachloride, giving a brown suspension. After addition of 25 milliliters of isoprene, the mixture was allowed to stand for two days. The rubbery product was purified by the method used in Example 3. Quantitative infrared structural analysis on this purified rubber showed it to contain 82% cis-1,4 structure, 15% trans-1,4 structure, 3% 3,4 structure, and no 1,2 structure. The presence of the "trans" component in this polymer is thought to have been caused by traces of diethylaluminum fluoride in the catalyst. A sample of this rubber was cross-linked using 1.5% by weight of decamethylene-bis-methylazo-dicarboxylate. This cross-linked product, when stretched, gave an X-ray diffraction pattern identical with that of natural Hevea rubber.

*Example 5*

Triethylaluminum (0.25 milliliter) under a helium atmosphere, was treated with 0.1 milliliter of titanium tetrachloride, immediately giving a brownish-black precipitate. The precipitate was suspended in 10 milliliters of pentane and 10 milliliters of isoprene were added. After 17 hours at room temperature, the product formed was purified by the method used in Example 3, yielding 2.6 grams (38%) of gel-free polymer having an inherent viscosity of 1.72. A second sample similarly prepared gave 3.9 grams (57% yield) of purified rubber having an inherent viscosity of 1.51.

*Example 6*

Isoprene was polymerized as in Example 5, except for the use of approximately 0.1 milliliter of triethylaluminum and 0.03 milliliter of titanium tetrachloride in the catalyst system. After 1 hour at room temperature, the polymerization mixture had solidified. After removal of benzene-insoluble products, as above, 2.9 grams (42.5% yield) of purified rubber with an inherent viscosity of 1.2 were obtained.

*Example 7*

To the dark brown precipitate, formed by adding 0.1 milliliter of titanium tetrachloride to 0.25 milliliter of triethylaluminum, 20 milliliters of isoprene were added. After 17 hours at room temperature, the mixture had solidified, and 1.4 grams of polymer, purified as in Example 3 (gel-free), were isolated.

*Example 8*

The precipitate formed by treating 0.25 milliliter of triisobutylaluminum with 0.1 milliliter of titanium tetrachloride was suspended in 10 milliliters of benzene. Ten milliliters of isoprene were added. After 20 hours at room temperature, 2.0 grams (29% yield) of crude rubber were isolated.

*Example 9*

To the precipitate formed by mixing 0.1 milliliter of triisobutylaluminum and 0.03 milliliter of titanium tetrachloride were added 10 milliliters of pentane and 10 milliliters of isoprene. After 24 hours at room temperature, 6.1 grams (90% yield) of crude rubber were obtained.

*Example 10*

A series of polymerizations were carried out as indicated in the following table. In these experiments, the triisobutylaluminum and the titanium tetrachloride were mixed, the complex formed was dispersed in 25 milliliters of pentane, and 25 milliliters of isoprene were added to this dispersion. The bottles were allowed to stand at room temperature.

| Experiment No. | Milliliters of Triisobutyl Aluminum | Milliliters of Titanium Tetrachloride | Yield of Rubber (Percent) |
|---|---|---|---|
| 1 | 0.25 | 0.06 | 8.0 |
| 2 | 0.25 | 0.08 | 25 |
| 3 | 0.25 | 0.10 | 59 |
| 4 | 0.25 | 0.12 | 87 |
| 5 | 0.25 | 0.16 | 89 |

The volumes of titanium tetrachloride were measured by drops, and are approximate. In terms of mols, 0.25 milliliter of triisobutylaluminum is equivalent to approximately 0.11 milliliter of titanium tetrachloride. The polymer prepared with more than the equivalent quantity of titanium tetrachloride tended to contain considerable amounts of gel, while those with equivalent amount, or less, of titanium tetrachloride were softer and showed relatively little gel.

*Example 11*

To a mixture of 1.0 milliliter of triethylaluminum ethyl etherate and 0.5 milliliter of titanium tetrachloride were added 15 milliliters of hexane and 25 milliliters of isoprene. After 17 hours at 50° C., the polymerization mixture solidified. A low molecular weight rubber was isolated which gave an infrared spectrum similar to that of natural rubber.

The examples illustrate the practice of the invention with particular respect to the use of the triethylaluminum-titanium tetrachloride, triisobutylaluminum-titanium tetrachloride and triethylaluminum-ethyl etherate-titanium tetrachloride complex catalysts. Other organo aluminum-titanium tetrachloride and organo aluminum etherate-titanium tetrachloride complex materials can also be used. Representative examples of such complexes are the complexes formed by the reaction of titanium tetrachloride with organo aluminum compounds of the general formula $$\begin{matrix} R_1 \\ R_2-Al \\ R_3 \end{matrix}$$

in which $R_1$ is selected from alkyl, aryl and aralkyl groups and $R_2$ and $R_3$ are selected from alkyl, aryl and aralkyl groups and hydrogen and with the etherates of these compounds. Representative examples of such compounds are ethylaluminum dihydride, n-propylaluminum dihydride, n-butylaluminum dihydride, isobutylaluminum dihydride, phenylaluminum dihydride, p-tolylaluminum dihydride, benzylaluminum dihydride, diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenyl ethylaluminum hydride, phenyl n-propylaluminum hydride, phenyl isopropylaluminum hydride, p-tolyl ethylaluminum hydride, p-tolyl n-propylaluminum hydride, p-tolyl isopropylaluminum hydride,

benzyl ethylaluminum hydride, benzyl n-propylaluminum hydride, benzyl isopropylaluminum hydride, trimethylaluminum, tri-n-propylaluminum, triisopropylaluminum, tri-n-butylaluminum, triisobutylaluminum, tripentylaluminum, triphenylaluminum, tri-p-tolylaluminum, tribenzylaluminum, ethyl diphenylaluminum, ethyl di-p-tolylaluminum, ethyl dibenzylaluminum, diethyl phenylaluminum, diethyl p-tolylaluminum, and diethyl benzylaluminum and the etherate complex materials such as the complexes with dimethyl ether, diethyl ether, di-n-propyl ether, diisopropyl ether, di-n-butyl ether, diisobutyl ether and diamyl ether. Representative examples of such etherates are ethylaluminum dihydride diethyl etherate, n-propylaluminum dihydride diethyl etherate, isopropylaluminum dihydride di-n-propyl etherate, phenylaluminum dihydride dibutyl etherate, p-tolylaluminum dihydride diisopropyl etherate, benzylaluminum dihydride diisobutyl etherate, phenyl ethylaluminum hydride diethyl etherate, p-tolyl ethylaluminum hydride diethyl etherate, benzyl ethylaluminum hydride diethyl etherate, triethylaluminum diethyl etherate, triisobutylaluminum diethyl etherate, triphenylaluminum di-n-propyl etherate, tri-p-tolylaluminum dibutyl etherate and tribenzylaluminum diisopropyl etherate.

The etherates such as diethyl etherate are generally formed by reacting an organo magnesium halide with an aluminum halide in ether. They can also be formed by adding the organo aluminum compound to an ether.

The polymerization reaction can be run in mass, in solution, or by contacting vapor of the monomer with the catalyst. It is preferred to run the reaction in the presence of an inert diluent such as cyclohexane, hexane, pentane or benzene. Any suitable hydrocarbon material that is inert to the polymerization reaction and which does not react with the catalyst can be used. It is preferred to use the saturated hydrocarbon solvents. Various ratios of solvent to monomer can be used.

The organo aluminum compound/titanium tetrachloride ratio can be varied over a wide range. Obviously, a sufficient amount of the catalyst complex must be formed to cause polymerization, but the catalyst concentration can be varied over wide limits.

As is usual with polymerization reactions, the temperature at which the polymerization is carried out may be varied over a wide range. It is desirable to use a temperature which will give a practical rate of reaction and which will give a good yield of polymer in a reasonable time.

This application is a continuation of application Serial No. 564,121, filed February 8, 1956, now abandoned.

While certain representative embodiments and details have been shown for the purpose of illustrating the invention, it will be apparent to those skilled in this art that various changes and modifications may be made therein without departing from the spirit or scope of the invention.

What is claimed is:

1. A method which comprises polymerizing isoprene in the presence of a catalytic amount of a complex of titanium tetrachloride with an etherate of a compound selected from the group consisting of organo metallic compounds of the general formula

in which $R_1$ is selected from alkyl, aryl and aralkyl groups and $R_2$ and $R_3$ are selected from alkyl, aryl and aralkyl groups and hydrogen 2. A method which comprises polymerizing isoprene in the presence of a catalytic amount of a complex of titanium tetrachloride with a dialkyl etherate of a compound selected from the group consisting of organo metallic compounds of the general formula

in which $R_1$ is selected from alkyl, aryl and aralkyl groups and $R_2$ and $R_3$ are selected from alkyl, aryl and aralkyl groups and hydrogen, the alkyl groups attached on the ether oxygen containing from 1 to 5 carbon atoms.

3. The method of claim 2 in which the catalyst is a triethylaluminum diethyl etherate-titanium tetrachloride complex.

4. The method of claim 2 is which the catalyst is a triisobutylaluminum diethyl etherate-titanium tetrachloride complex.

5. The method of claim 1 in which the polymerization reaction is carried out in an inert solvent.

6. The method of claim 2 in which the polymerization reaction is carried out in an inert solvent.

7. The method of claim 5 in which the inert solvent is a hydrocarbon.

8. The method of claim 6 in which the inert solvent is a hydrocarbon.

9. The process for polymerizing isoprene which comprises forming a mixture of triethyl aluminum-ethyl etherate and titanium tetrachloride in which 0.5 volume of titanium tetrachloride is used per volume of triethyl aluminum-ethyl etherate, adding a mixture of 25 volumes of isoprene and 15 volumes of hexane per volume of triethyl aluminum-ethyl etherate used and carrying out the polymerization reaction at 50° C.

No references cited.

UNITED STATES PATENT OFFICE
CERTIFICATE OF CORRECTION

Patent No. 3,047,559        July 31, 1962

Rowland H. Mayor et al.

It is hereby certified that error appears in the above numbered patent requiring correction and that the said Letters Patent should read as corrected below.

Column 1, lines 25 to 29, the formula should appear as shown below instead of as in the patent:

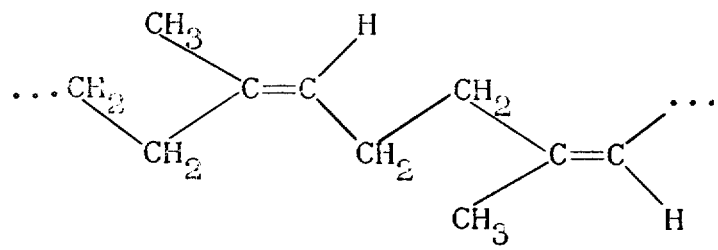

same column, lines 32 to 44, the formula should appear as shown below instead of as in the patent:

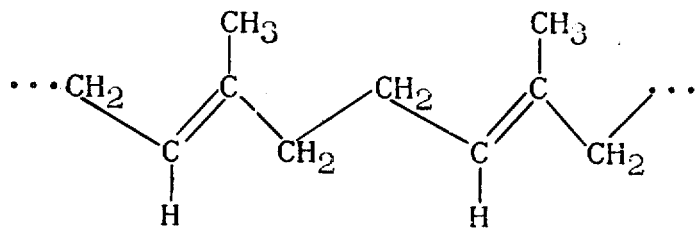

column 2, line 50, for "to" read -- at --; same column, line 68, for "1000° C." read -- 100° C. --.

Signed and sealed this 26th day of February 1963.

(SEAL)
Attest: